No. 641,728. Patented Jan. 23, 1900.
T. C. ROBINSON.
BICYCLE DRIVING MECHANISM.
(Application filed Feb. 12, 1898.)
(No Model.) 2 Sheets—Sheet 1.
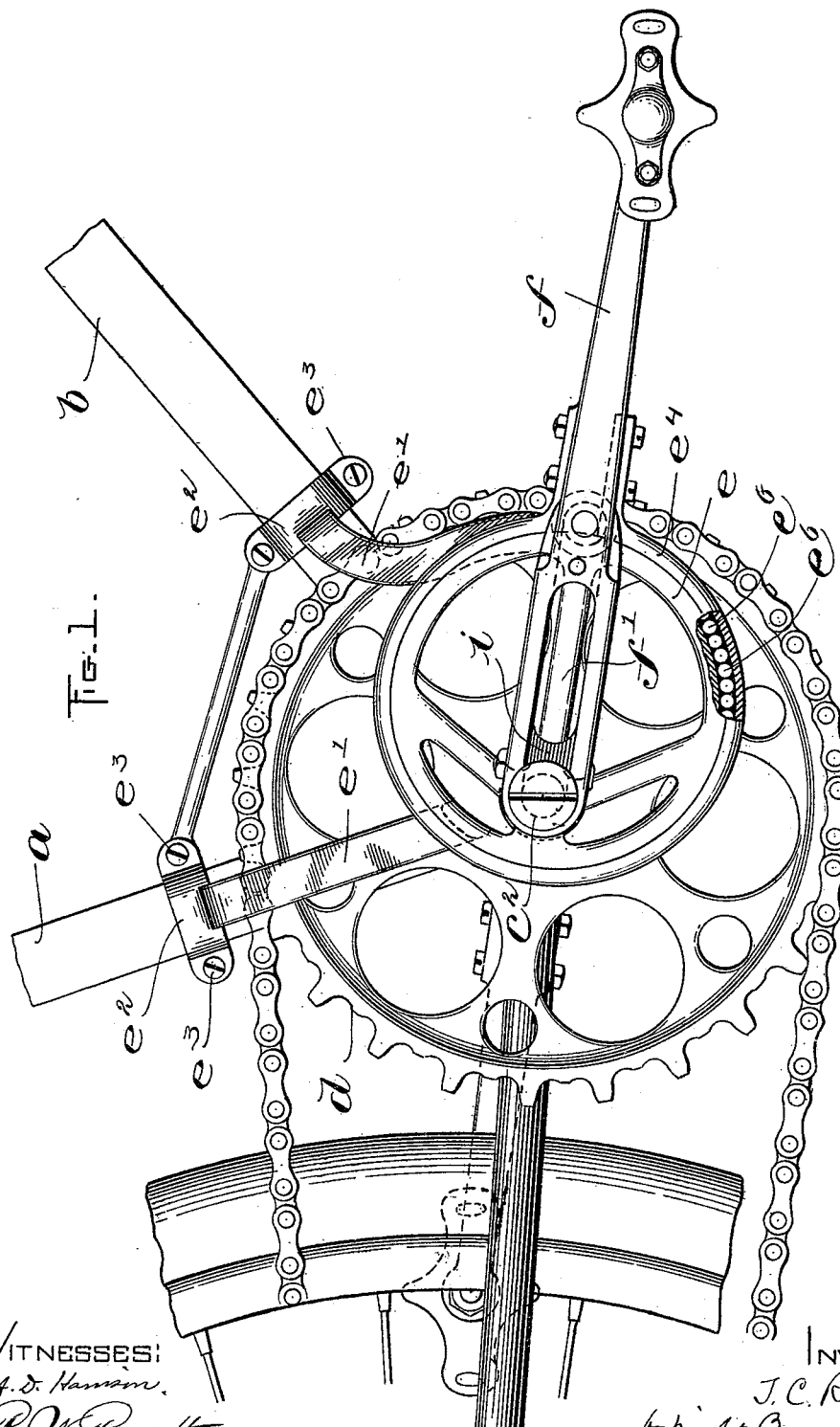

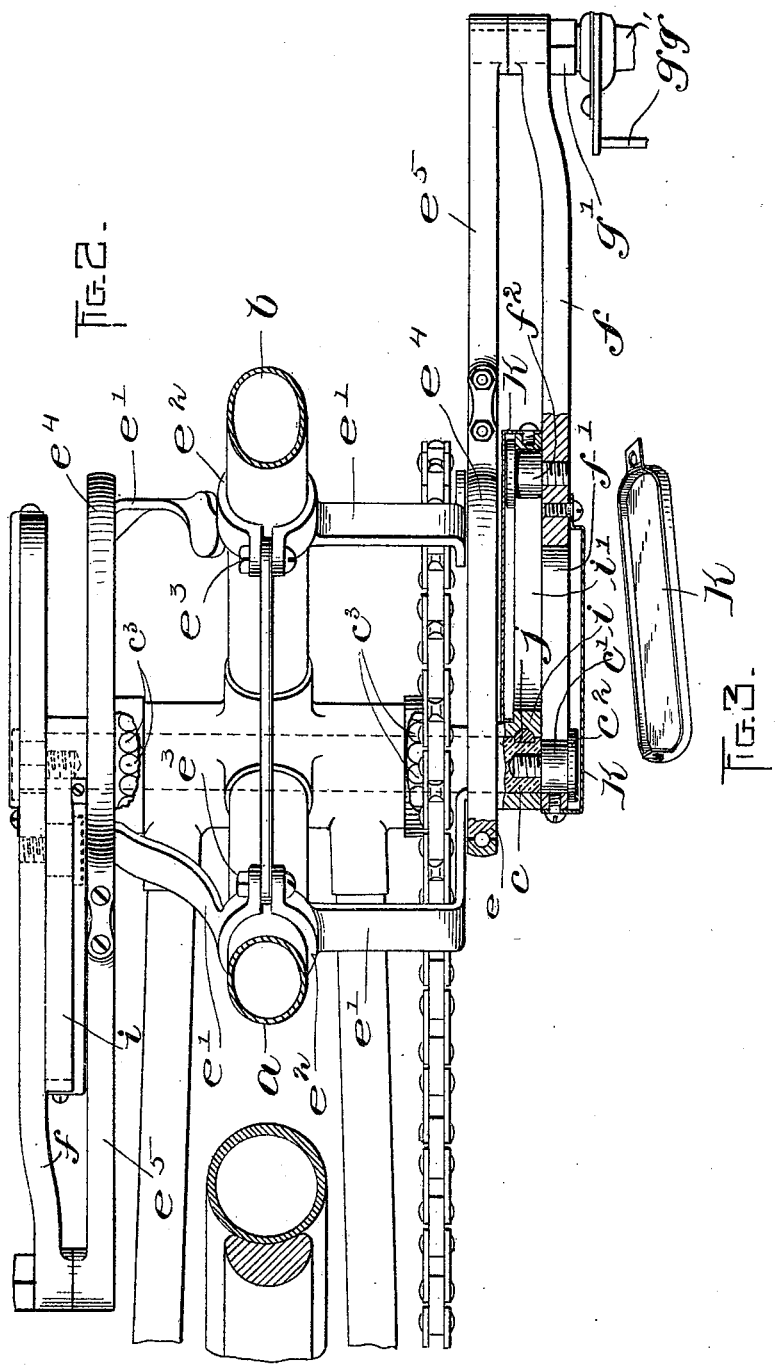

UNITED STATES PATENT OFFICE.

THOMAS C. ROBINSON, OF MALDEN, MASSACHUSETTS, ASSIGNOR OF ONE-HALF TO E. BAKER WELCH, OF CAMBRIDGE, MASSACHUSETTS.

BICYCLE DRIVING MECHANISM.

SPECIFICATION forming part of Letters Patent No. 641,728, dated January 23, 1900.

Application filed February 12, 1898. Serial No. 670,019. (No model.)

*To all whom it may concern:*

Be it known that I, THOMAS C. ROBINSON, of Malden, in the county of Middlesex and State of Massachusetts, have invented certain new and useful Improvements in Bicycle Driving Mechanism, of which the following is a specification.

This invention relates to the driving mechanism of bicycles and similar vehicles; and it consists in the novel features of construction and arrangement, which I shall now proceed to describe and claim.

Of the accompanying drawings, forming a part of this application, Figure 1 represents in side elevation and section a bicycle driving mechanism constructed in accordance with my invention, with parts removed. Fig. 2 represents a top plan view and section of the same. Fig. 3 represents a perspective view of one of the dust-caps employed.

The same reference characters indicate the same parts in all the figures.

Referring to the drawings, $a$ $b$ are the two lower main-frame bars of a bicycle, $c$ is the crank-shaft, journaled in ball-bearings $c^3$ $c^3$, and $d$ is the forward sprocket-wheel, affixed in the usual manner to the shaft $c$ and connected with the rear wheel by means of a chain. Any other suitable or preferred device might of course be used in place of a chain for transmitting power from the crank-shaft to the rear wheel.

$e$ $e$ are eccentrics rigidly affixed to the frame-bars $a$ $b$ on either side of the machine by means of brackets $e'$ $e'$, formed with split collars $e^2$ $e^2$, which are clamped to the frame by means of bolts $e^3$ $e^3$. The brackets on the sprocket side are shaped to pass over and outside of the sprocket and chain, as shown.

$e^4$ $e^4$ are the straps of the eccentrics $e$ $e$, each of said straps having an arm or crank $e^5$ formed on or otherwise attached to it. Between the straps and the eccentrics are interposed antifriction-balls $e^6$ $e^6$, which allow one part to revolve on the other with the minimum of friction.

$f$ is a lever or crank arranged parallel to the crank $e^5$ and meeting the same at its outer end, the two being headed or shouldered and joined together by means of the screw-threaded shaft $g'$ of the pedal $g$. The rear end of the lever $f$ is formed with a slot $f'$, in which operates a roller $c'$, which is affixed on the end of the crank-shaft $c$ by means of a shouldered screw-stud $c^2$.

$i$ is an auxiliary crank affixed to the crank-shaft $c$ by means of a key $j$ and formed with a slot $i'$, similar to the slot in the lever $f$ and preferably of equal length. In said slot $i'$ operates a roller $f^2$, similar to the roller $c'$ and affixed to the inside of the lever $f$. Dust-caps $k$ $k$, screwed to the crank $i$ and lever $f$ and covering the slots in said members, serve to protect the parts from dust and other obstructions. These dust-caps are removed in Fig. 1.

The operation of the device will be readily understood. When power is applied to the pedal $g$, the said pedal is constrained to revolve in a circle whose center is the center of the eccentric. The pedal is therefore, in the arrangement shown, at a greater distance from the crank-shaft $c$ on the downstroke than it is on the upstroke, and since the crank-shaft is non-rotatively connected with the lever $f$ it follows that the torsion exerted on the crank-shaft is greater on the downstroke, thus giving the rider advantage on this stroke without enlarging the circle traveled by his feet. On the back stroke from the position of the parts shown in Figs. 1 and 2 the rollers $c'$ and $f^2$ are brought near together at the opposite ends of the slots $f'$ and $i'$.

It will be seen from the foregoing description that by means of my invention I provide a driving mechanism for bicycles and similar vehicles which combines with the advantage in propulsion hereinbefore mentioned strength and simplicity, together with adaptability to vehicles already in use. In providing a machine of the ordinary pattern with my device no alterations in the frame are necessary, as will readily be understood from the drawings and description.

I am aware that it has been proposed heretofore to employ a fixed eccentric in changing the leverage in a bicycle crank mechanism, and I do not claim such a construction broadly.

I claim—

1. In a mechanism of the character described, in combination, a crank-shaft, an eccentric affixed to the bicycle-frame and having a strap, a lever carrying at its outer end the pedal-shaft and formed with a slot in its inner end, a pivotal connection between said lever and the eccentric-strap, a roller attached to the crank-shaft, and forming a fulcrum for said lever, an auxiliary crank secured to the crank-shaft and formed with a slot, and a roller attached to the lever and operating in said slot.

2. In a mechanism of the character described, in combination, a crank-shaft, an eccentric affixed to the bicycle-frame, an arm or crank attached to the strap of said eccentric and carrying the pedal-shaft at its outer end, a lever attached at its outer end to the pedal-shaft and formed with a slot in its inner end, a roller attached to the crank-shaft and forming a fulcrum for said lever, an auxiliary crank secured to the crank-shaft between the strap-crank and the lever and formed with a slot, and a roller attached to the lever and operating in said slot.

In testimony whereof I have affixed my signature in presence of two witnesses.

THOMAS C. ROBINSON.

Witnesses:
A. D. HARRISON,
P. W. PEZZETTI.